(12) United States Patent
Lee et al.

(10) Patent No.: US 6,601,100 B2
(45) Date of Patent: Jul. 29, 2003

(54) SYSTEM AND METHOD FOR COLLECTING AND ANALYZING INFORMATION ABOUT CONTENT REQUESTED IN A NETWORK (WORLD WIDE WEB) ENVIRONMENT

(75) Inventors: Juhnyoung Lee, Yorktown Heights, NY (US); Leora Morgenstern, New York, NY (US); Mark Edward Podlaseck, Washington, CT (US); Edith Gail Schonberg, New York, NY (US); David A. Wood, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/208,449

(22) Filed: Jul. 30, 2002

(65) Prior Publication Data

US 2002/0198939 A1 Dec. 26, 2002

Related U.S. Application Data

(63) Continuation of application No. 09/238,861, filed on Jan. 27, 1999, now Pat. No. 6,466,970.

(51) Int. Cl.$^7$ ............................................. G06F 15/173
(52) U.S. Cl. ..................... 709/226; 709/224; 709/225; 709/229; 705/10
(58) Field of Search ............................... 709/224, 225, 709/226, 229; 705/10

(56) References Cited

U.S. PATENT DOCUMENTS

| | | | |
|---|---|---|---|
| 5,848,396 A | | 12/1998 | Gerace ........................ 705/10 |
| 5,895,470 A | | 4/1999 | Pirolli et al. ................ 707/102 |
| 5,897,622 A | | 4/1999 | Blinn et al. .................... 705/26 |
| 5,920,700 A | * | 7/1999 | Gordon et al. ............... 709/226 |
| 5,933,811 A | | 8/1999 | Angles et al. ................. 705/14 |
| 5,937,392 A | | 8/1999 | Alberts ......................... 705/14 |
| 5,956,693 A | | 9/1999 | Geerlings ..................... 705/14 |
| 5,974,396 A | | 10/1999 | Anderson et al. ............. 705/10 |
| 5,991,735 A | | 11/1999 | Gerace ........................ 705/10 |
| 6,032,184 A | | 2/2000 | Cogger et al. ............... 709/223 |
| 6,044,205 A | * | 3/2000 | Reed et al. .................. 709/201 |
| 6,055,513 A | | 4/2000 | Katz et al. .................... 705/26 |
| 6,088,717 A | | 7/2000 | Reed et al. .................. 709/201 |
| 6,094,657 A | | 7/2000 | Hailpern et al. ............. 707/103 |
| 6,119,118 A | | 9/2000 | Kain, III et al. .............. 707/10 |
| 6,151,624 A | | 11/2000 | Teare et al. .................. 709/217 |
| 6,282,548 B1 | * | 8/2001 | Burner et al. ............. 707/104.1 |
| 6,466,970 B1 | * | 10/2002 | Lee et al. .................... 709/217 |
| 6,470,383 B1 | * | 10/2002 | Leshem et al. ............. 709/223 |
| 6,484,149 B1 | * | 11/2002 | Jammes et al. ............... 705/26 |

OTHER PUBLICATIONS

"E–Business Commerce," IBM's E–Business Web Site, http://www.ibm.com/e–business, Downloaded on Nov. 4, 1998.

"Accrue Insight: eBusiness Analysis Software for your Enterprise," White Paper, Accrue Web Site, http://www.acrue.com, (1998).

(List continued on next page.)

*Primary Examiner*—Saleh Najjar
(74) *Attorney, Agent, or Firm*—Ryan, Mason & Lewis, LLP; Louis J. Percello, Esq.

(57) ABSTRACT

A server system on a network such as the World Wide Web aggregates and stores information about the content of Web pages served by a server on a network. A server process receives one or more requests for Web pages from requesters connected to the network. Upon receiving the request, the server produces a requested Web page and serves the Web page to the requester. The Web pages have with one or more content elements in addition to one or more metadata entries. The metadata entries are associated with the content elements of the respective Web page produced. The system also creates and maintains a log having a plurality of records. Each record has requester fields and metadata fields. A logger process stores the metadata entries contained in each of the Web pages in one or more of the metadata fields, and stores a requester identification, associated with the requester, in the requester field of the record associated with the respective Web page.

11 Claims, 12 Drawing Sheets-

OTHER PUBLICATIONS

Arad, A., "Andromedia, Analyzing, Optimizing and Justifying Dynamic Web Sites," http://andromedia.com/products_solutions/whitepaper/analize_optimize.html, (1998).

"A White Paper on Bazaar Analyzer Products," White Paper, Aquas Web Site, http://www.statslab.cam.ac.uk/~sret1/analog/, Downloaded on Nov. 4, 1998.

"Analog: The Most Popular Logfile Analyser in the World," Analog Web Site, http://www.statslab.cam.ac.uk/~sret1/analog, (1998).

wwwstat: HTTPd Logfile Analysis Software, wwwstat Web Site, http://www.ics.uci.edu/pub/websoft/wwwstat/, (1998).

"Open AdStream By Real Media," Real Media Web Site, http://www.realmedia.com, Downloaded on Nov. 4, 1998.

"IBM SurfAid Analytics: Technical Overview," IBM SurfAid Web Site, http://www.netmining.dfw.ibm.com, (1998).

"Site Server 3.0, Commerce Edition," White Paper, Microsoft Corporation, (1998).

Stout, R., "Web Site Stats: Tracking Hits and Analyzing Web Traffic," Osborne/McGraw–Hill, pp. 53–86, (1997).

Tower et al., "Measuring Internet Returns," The Forrester Report: Interactive Technology Strategies, vol. 2, No. 11, (1998).

\* cited by examiner

SYSTEM AND METHOD FOR COLLECTING AND ANALYZING INFORMATION ABOUT CONTENT REQUESTED IN A NETWORK (WORLD WIDE WEB) ENVIRONMENT

CROSS REFERENCE TO RELATED APPLICATIONS

This application is related to U.S. patent application No. 09/238,238, entitled AGGREGATING AND ANALYZING INFORMATION ABOUT CONTENT REQUESTED IN A NETWORK (WORLD WIDE WEB) ENVIRONMENT TO DETERMINE CONVERSION RATES, filed on the same day as this invention with the same inventorship. This application is a continuation of U.S. patent application Ser. No. 09/238,861, filed on Jan. 27, 1999, now U.S. Pat. No. 6,466,970.

FIELD OF THE INVENTION

This invention relates to collecting and analyzing information about the content requested and provided in a networking environment. More specifically, the invention relates to collecting and analyzing information about the content requested from users and provided by a server in an e-commerce application on a network such as the Internet. In particular, the invention relates to collecting such data over a period of time in a log record which can be subsequently used in aggregation and analysis.

BACKGROUND OF THE INVENTION

The Internet, fueled by the phenomenal popularity of the World Wide Web, has exhibited exponential growth over the past few years. It has gone from being a communication route primarily for scientists, researchers, and engineers to an essential information exchange vehicle for broad segments of the populace, including consumers, marketers, educators, children, and entertainers. Over one billion Web pages currently exist on the Internet, and over 40 million users read and interact with them. As the Internet's commercial value is recognized, numerous companies and organizations are experimenting with electronic commerce (also referred to as e-commerce), the buying and selling of goods, information, and services over the Internet (see, for example, IBM's Web site for Macy's at http://www.macys.com). And as more and more of these companies demonstrate the financial viability of electronic commerce, there has been increasing momentum to develop sites that transact business over the Web.

Any Web site owner needs to know whether the Web site effectively serves its intended purpose; that is, how many people visit the Web site, who these people are, what they want, and what they do at the site while they are there. This is particularly true of the domain of electronic commerce. The ability to analyze and understand traffic flow, the way customers navigate from page to page in a site, is critical for successful product marketing and sales.

The major source of user activity data available today is the Web server log. A Web server is the computer that sends World Wide Web documents to browsers upon request. The Web server log is a low-level, technical account of Web server activities and is generated by all commonly used Web servers. The Web server log consists of a file containing an entry for each Web page served, showing the IP (Internet Protocol) address of the client (the machine of the user who is visiting the Web site using an application); a timestamp, indicating the exact date and time on which the visit occured; the URL (Universal Resource Locator) of the requested page, the referrer URL (the URL of the page that the user clicked on to get to the current page), the browser type, and the number of bytes transferred.

Various commercial products and freeware packages (for example, Accrue's Insight, Andromedia's ARIA, e.g. Software's WebTrends, and Aquas's Bazaar Analyzer) use Web server logs to analyze Web server and user activities and generate reports. Examples of the kind of information that is typically reported are the number of visitors at a Web site during a given time period, the most and least frequently visited pages, the most frequent entry pages (the first page a user visits during a session at a Web site), the most frequent exit pages (the last page a user visits during a session at a Web site), and the visitor demographic breakdown based on IP address and browser type. The URLs in the Web server log often contain special user identifiers obtained by using "cookies". A cookie is a piece of information shared between a user's Web browser and a Web server, originating as a message sent by a Web server to the Web browser visiting the server's site, subsequently stored in a text file on the user's hard drive, and sent back to the server each time the browser requests a page from the server. From the sequence of URLs in the Web server log and the associated cookies, it is possible to reconstruct the URL paths that individual users traverse, and from this obtain the most frequently traversed paths through the Web site.

Some Web sites in the past have used clever methods for collecting more data about user behavior by using a form of URL rewriting. They tag extra data about the user/requester to URLs of the served Web pages, so that the extra data of their analysis needs will be found in the server log. This method is usually used for adding user-related data (e.g., user-id and session-id).

Advertising banner services have developed an interesting way to measure not only who clicked on their banners, but who saw the banners. These figures not only are used to calculate the rate charged for the banners, but also the effectiveness of the banner, known as the conversion rate. The conversion rate is found by dividing click-thoughs by impressions (the number of times that the banner was served and hopefully seen). Currently the prior art is able to determine conversion rates only for specific types of advertising banners. Some Web advertising services (e.g., Real Media's Open AdStream) record impressions and click-throughs by using script programs, programs consisting mainly of strung together commands, such as those you might issue at a command line. These services add a script program to the HTML image source tag, which points to the image displayed as the advertisement. (HTML, HyperText Markup Language, is the authoring tool used to create documents on the World Wide Web. Tags are commands, generally specifying how a portion of a document should be formatted; tags can also refer to the links which allow users to move from one Web page to another.) In addition, these services add a script program to the anchor tag, the HTML tag which acts as a link to the advertised site. The first script gets invoked when the advertised image is displayed and records its view; the second script gets invoked when a visitor clicks on the image (to visit the advertised site) and records the click.

PROBLEMS WITH THE PRIOR ART

One fundamental limitation of existing Web site analysis tools is that they rely solely on information in the server Web log, which is URL-based. Why isn't this enough? A URL indicates only the location of a served Web page and often very little about its content, particularly if the page in question is dynamic (generated from a database, a personalization profile, or search query) or simply no longer exists.

Business people, on the other hand, are interested in the content viewed by their audience, not the addresses of that content. What products are customers looking at? What products are they being shown? Do pages contain the products in which customers are interested? Is the style of presentation working? Is there easy access to the information the visitor is looking for? What links on each page did the visitor not click on? In an electronic commerce Web site, answers to these kinds of questions can feed back into the architecture and design of the Web site, increase its effectiveness, and thereby maximize the return on investment. Unfortunately, it is not straightforward to answer these questions for today's Web sites with existing log analysis tools.

A second limitation of conventional log analysis software products is that while they provide the click-throughs of hyperlinks, none of them can provide the impressions of hyperlinks and conversion rates as do Web advertising banner services. Unfortunately, even the method used by the Web advertising services restricts them to collecting impression data only for specific types of hyperlinks such as image-based ad banners, not for text- or form-based hyperlinks. Also, this method is costly, because the script programs need to be invoked on a hyperlink basis (one invocation for every link), as opposed to on a page basis (one invocation for every page).

Without the ability to collect, aggregate, and/or analyze detailed information about the interaction of visitors with Web content, Web designers and marketers currently rely on ad hoc knowledge of a few experts in the area (e.g. creative designers). The current dependence on a few human experts for Web site design and management is evidence that it is more of an art than a science, and that there are not sufficient systems or tools for it. This method is expensive, inefficient, faulty, and subjective. It is often seen that experts express contradictory opinions about the same Web site design.

OBJECTS OF THE INVENTION

An object of this invention is an improved system and method for logging information about Web requesters and content of Web pages served by a server on a network, particularly a server on the World Wide Web.

SUMMARY OF THE INVENTION

The present invention is a computer system and method for collecting, analyzing, aggregating, and storing information about the content of one or more Web pages served by a server on a network. In a preferred embodiment, the server is on the World Wide Web and is performing an e-commerce function such as hosting a store that sells products or services.

The server has one or more central processing units, one or more memories, and one or more network interfaces connected to one or more networks. A server process is executed by one or more of the central processing units and receives one or more requests for one or more Web pages from one or more requesters connected to the network. The requests enter the server through one or more of the network interfaces. Upon receiving the request, the server produces each requested Web page from one or more memories, serves Web pages to the requester, and continues until all requested Web pages have been served. The Web pages have one or more content elements, blocks of text, images, and/or hyperlinks which provide specific information about predefined areas of interest, in addition to one or more metadata entries, tags in a meta language which categorize the content elements of a Web page. One or more of the metadata entries are associated with the content elements of the respective Web page produced. In a preferred embodiment, each metadata entry has an entry type and an entry value.

The system creates and maintains a log having a plurality of records. Each record has one or more requester fields and one or more metadata fields.

A logger process is executed by the server process. The logger process stores the metadata entries contained in each of the Web pages in one or more of the metadata fields, and stores a requester identification, associated with the requester, in the requester field of the record associated with the respective Web page.

In a preferred embodiment, an aggregation process traverses the log to extract one or more of the metadata fields. A counter set, generated by the aggregation process, has a plurality of counters. Each counter has a counter object (or counter type), a counter event, and a counter value. For instance, the counter keeps track of how many times a particular hyperlink, Web page, product, and/or product category was seen or selected (event) by requesters. A conversion rate set, also generated by the aggregation process, has a plurality of rates, where each rate has a rate object, a rate event and a rate value. For instance, the conversion rate set might track how many times a product/product category was selected with respect to the number of times a particular Web page or hyperlink related to the selected product/product category was seen.

DETAILED DESCRIPTION OF THE INVENTION

Figure 1:
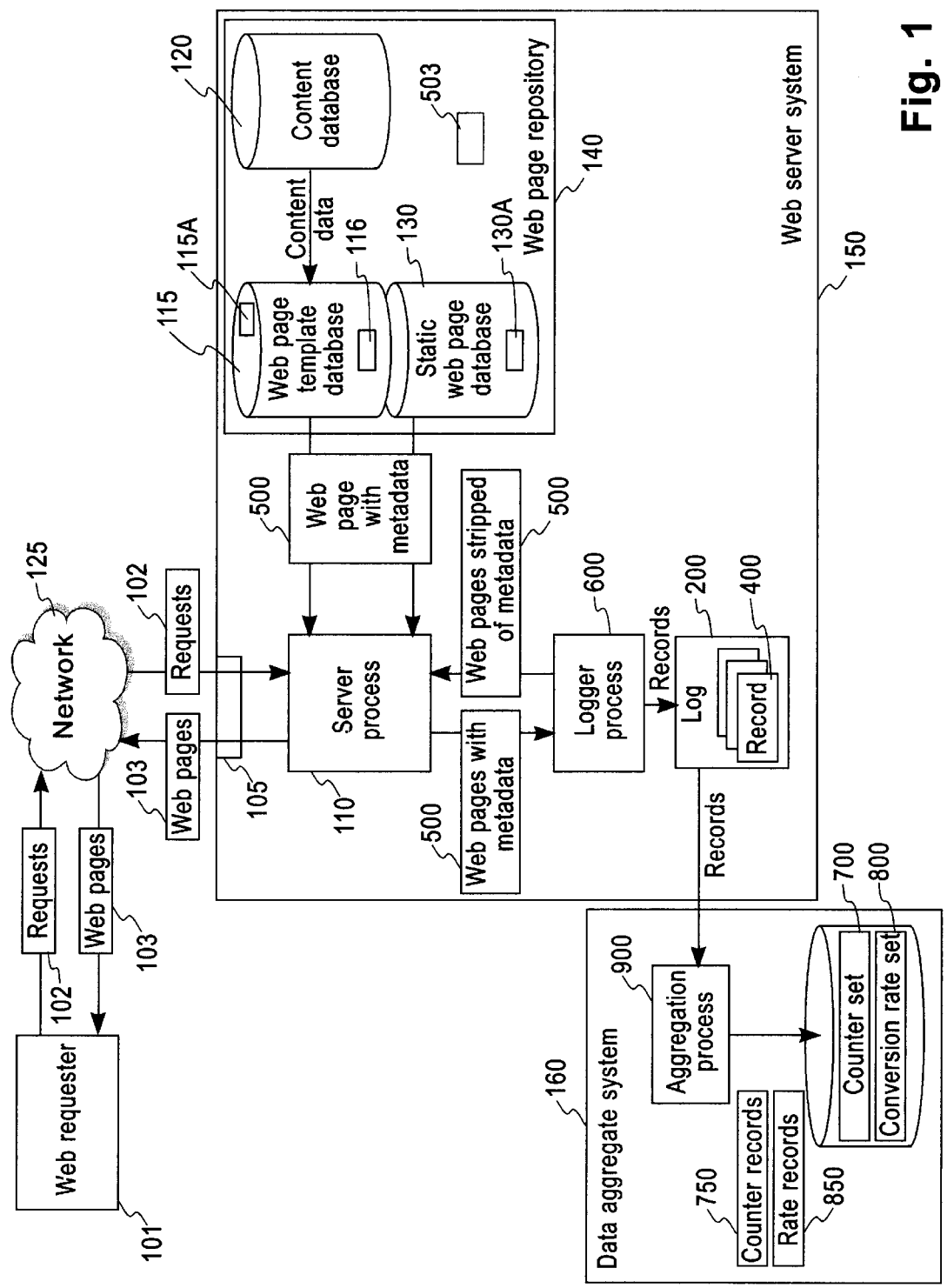
FIG. 1 is a block diagram of one preferred embodiment of the present system.

FIG. 1 is a block diagram of one preferred embodiment of the present system (100) showing one or more Web requesters (101), a Web server system (150), a network (125) connection (105) between the Web requesters (101) and the Web server system (150), and a data aggregator system (160).

A Web requester (101) uses a Web browser software, e.g., Netscape Navigator or Microsoft Internet Explorer, running on a computer, e.g., an IBM desktop computer, to communicate with one or more of the Web server systems (150) over a computer network or a collection of such networks (125), e.g., the Internet. The Web requester sends one or more requests for Web pages (102) to the Web server system (150) and receives from the Web server system (150) the Web pages (103) which are rendered on the requester's browser software.

In an electronic commerce environment, Web server systems (150) provide facilities for commerce activities of Web requesters (101) in addition to the basic Web page service. In such an environment, Web requesters (101) may be able to not only browse information about merchandise and services for sale on the Web server system, but also place one or more orders for products or services of their need, pay for the purchased merchandise or services, and request other customer services regarding the purchasing activities.

The Web server system (150) is typically a computer workstation, e.g., an IBM RS/6000 computer, on which two or more software processes including a server process (110) and, typically, a logger process (600) are executed. The server process (110) provides a core function of the Web server system (150). It receives one or more requests for Web pages (102) from one or more Web requesters (101), produces the requested Web pages (103) from the Web page repository (140), and sends back each of the Web pages (103) to the Web requesters (101) over the computer network or a collection of such networks (125).

The Web page repository (140) is a computer storage system, e.g., a file system of an IBM AIX operating system or an IBM DB2 database system, that stores Web pages (103) served by the Web server system (150). There are sections of the repository (140), static (130) and dynamic (115 and 120) that respectively handle two types of Web pages (103), i.e., static pages (130A) and dynamic pages (115A). Static Web pages (130A) are stored in the repository in the same form as they are served to the Web requesters (101). They are stored in the static Web page database (130). Dynamic Web pages (115A) typically are dynamically generated by the server process (110) only when there is a request for one. The server process (110) extracts one or more values of one or more parameters embedded in a request (102) from a Web requester (101), and uses the parameter values to obtain data relevant to the requested Web page from the content database (120). Then the server process (110) selects a relevant Web page template (116) from the Web page template database (115), and constructs the Web page (115A) by filling the extracted data into the Web page template (116).

For example, if the server process (110) receives a request whose URL is www.xxx.com/cgi-bin/e-store/category?categorynumber=3318, it first extracts the value 3318 for the parameter, categorynumber. Next, it obtains data about the category from the content database (120) by using 3318 as the data retrieval key. Then, the server process (110) selects a category display template (116) from the Web page template database (115), and fills the retrieved data about category 3318 into the template (116) to produce the dynamic Web page (115A) which then can be sent to the Web requester (101).

The Web page repository (140) also stores metadata (503) about Web pages, static (130A) or dynamic (115A). The metadata about a Web page is a description of the Web page itself and/or its content such as hyperlinks embedded in the Web page (103). The metadata of a Web page is created, updated, stored, and retrieved with the corresponding Web page (115A, 130A). Thus when the server process (110) produces a Web page to serve, the server process (110) gets a Web page (103) with its metadata (500, 503).

In a preferred embodiment, the logger process (600) is a software process running on the Web server system (150) in conjunction with the server process (110). The logger process (600) receives every Web page with metadata (500) from the server process (110) before the page (103) is sent to the requester (101). The logger process (600) extracts the metadata (503) attached to the Web page (103) and stores it (503) in a record (400) in a log (200) along with some information about the Web requester (101) who made the respective Web page request (102). The server process (110) is able to collect the information on the Web requester (101) from the information embedded in the request (102), and passes requester information to the logger process (600). (See the description of FIG. 6, below.) After recording the metadata (503) in the log (200), the log process (600) gives back the Web page (103) to the server process (110). At this point, the logger process (600) may remove the metadata (503) from the Web page (103), so that the server process (110) sends to the requester (101) only the Web page without its metadata (500A, 103).

The data aggregator system (160) is a computer workstation, e.g., an IBM RS/6000 computer, on which one or more software processes including the aggregation process (900) are executed. Note that the data aggregator system (160) may be separate or combined with the Web server system (150). The aggregation process (900) traverses the records (400) in the log (200) one by one, and counts the numbers of distinct occurrences of one or more metadata (503) types for a fixed period of time. The process records the numbers in one or more counter records (750). The collection of the counter records (750) builds up a counter set (700). For example, a counter record may store the number of impressions of an image link of an IBM G42 monitor product on the Web pages (103) served by the Web server system (150) for a certain time interval. Also a counter record (750) may record the number of click-throughs on an image link of an IBM G42 monitor product among the Web pages served by the Web server system (150) for a fixed period of time.

The aggregation process (900) may also determine one or more rates by using the numbers recorded in the counter records (750) in the counter set (700). (See description of FIGS. 7 and 8, below, for more detail.) Each rate is recorded in a rate record (850), and the conversion rate set (800) comprises the collection of the rate records (850). For example, a rate record (850) may store the rate of the number of click-throughs to the number of impressions of an image link of an IBM G42 monitor product among the Web pages served by the Web server system (150) for a fixed period of time.

Figure 2:
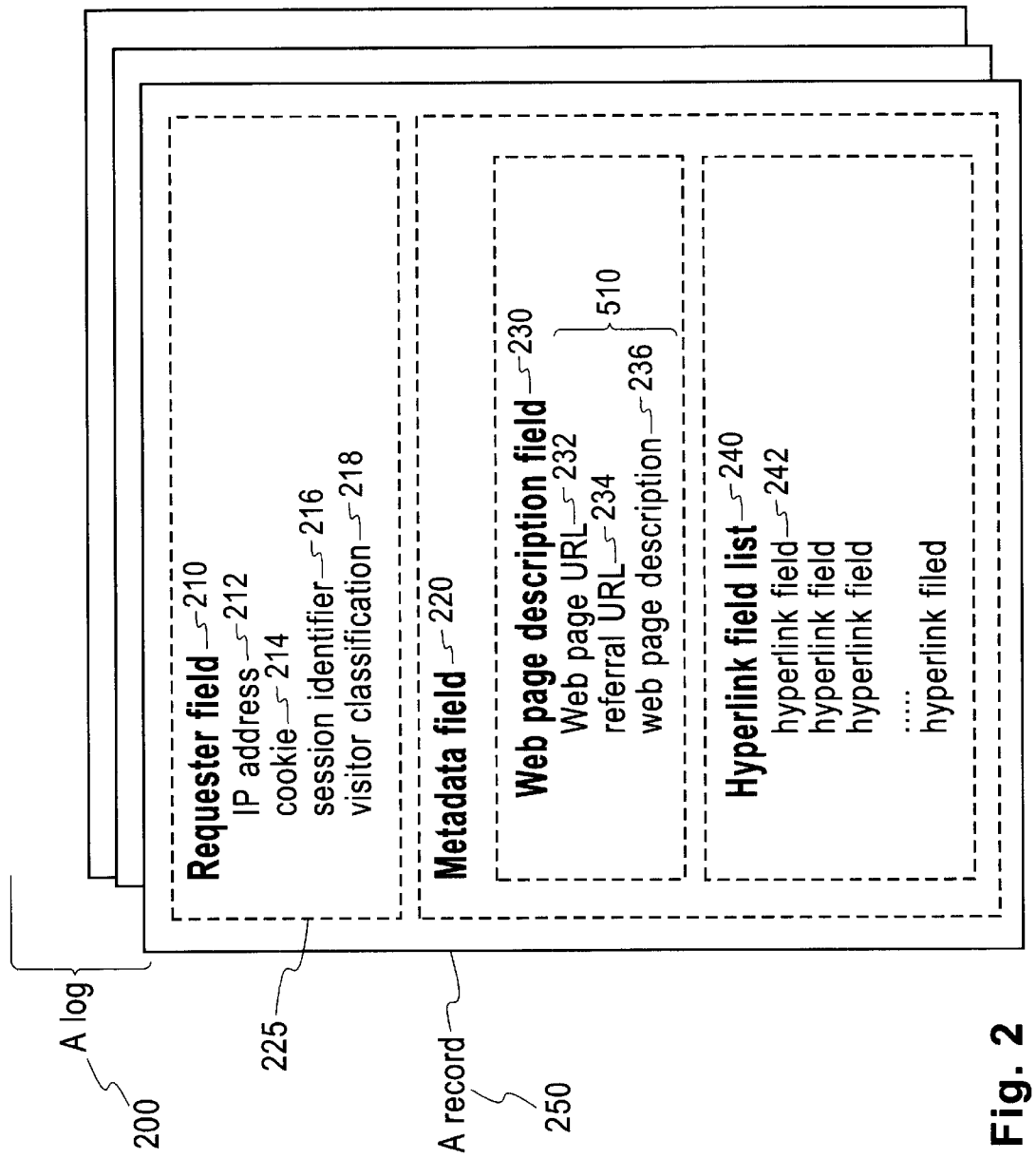
FIG. 2 is a block diagram of a log record template which contains requester identification information and metadata about a requested Web page.

FIG. 2 is a block diagram of a log record (400, 250) (including a template in a preferred embodiment) which contains requester identification information (225) and metadata (220) about a requested Web page (103). The log (200) comprises a set of these log records (250). Each log record (250) contains information describing the user (225) who requested the Web page (103) as well as a description (220) of the requested Web page. Instantiations of this log (200) will be used in the analysis of Web server (150) and/or requester behavior. The structure of this template is thus carefully designed to capture those pieces of information which will be most useful in the analysis process.

In one preferred embodiment, the requester field (210) contains information to identify and classify the user making the request. Here there are typically three subfields of interest:

- a unique identifier (212) for a computer or other device on a TCP/IP network, used for routing purposes in accordance with the TCP/IP protocol, i.e., the IP address of the requester (212).
- a piece of information that uniquely identifies the particular session between the client/requester (101) and the server (150), e.g., information shared between a requester's Web browser and a Web server (150). In a preferred embodiment this could be a requester cookie (214), originating as a message sent by a Web server to a Web browser visiting the server's site, subsequently stored in a local file, and sent back to the server upon request. The requester cookie could provide the session identifier (216), the alphanumeric string which uniquely identifies the particular session(s) between a client (101) and a server (150).
- an optional visitor classification (218), e.g. a method of categorizing visitors according to some predetermined classification.

The metadata field (220) describes the Web page that is being requested. It comprises two parts: the Web page description field (230) and the hyperlink field list (240). The Web page description field (230) gives a general description of the Web page (103). It (230) typically comprises the Web page URL (232), the referral URL (234), i.e., the URL of the page the requester was on when the person requested this Web page, and the Web page description (236). In a preferred embodiment, the Web page description (236) typically comprises a text string that gives a thumbnail characterization of the requested Web page. An example (236A) of the Web page description field is given in FIG. 4 where the Web page annotated in the log record describes a particular product category which is laptop computer.

The hyperlink field list (240) comprises a set of hyperlink fields (242) from the requested Web page (103) to some other Web page. Thus, this list characterizes the types of pages which can be accessed from the requested Web page (103). Because the function of a Web page (103) often lies mostly in the set of Web pages which can be accessed, this information is included as part of the metadata field (220) in a preferred embodiment. The hyperlink field description is defined in detail in the description of FIG. 3 below. A particular instantiation of this record template is given in the description of FIG. 4 below.

Figure 3:
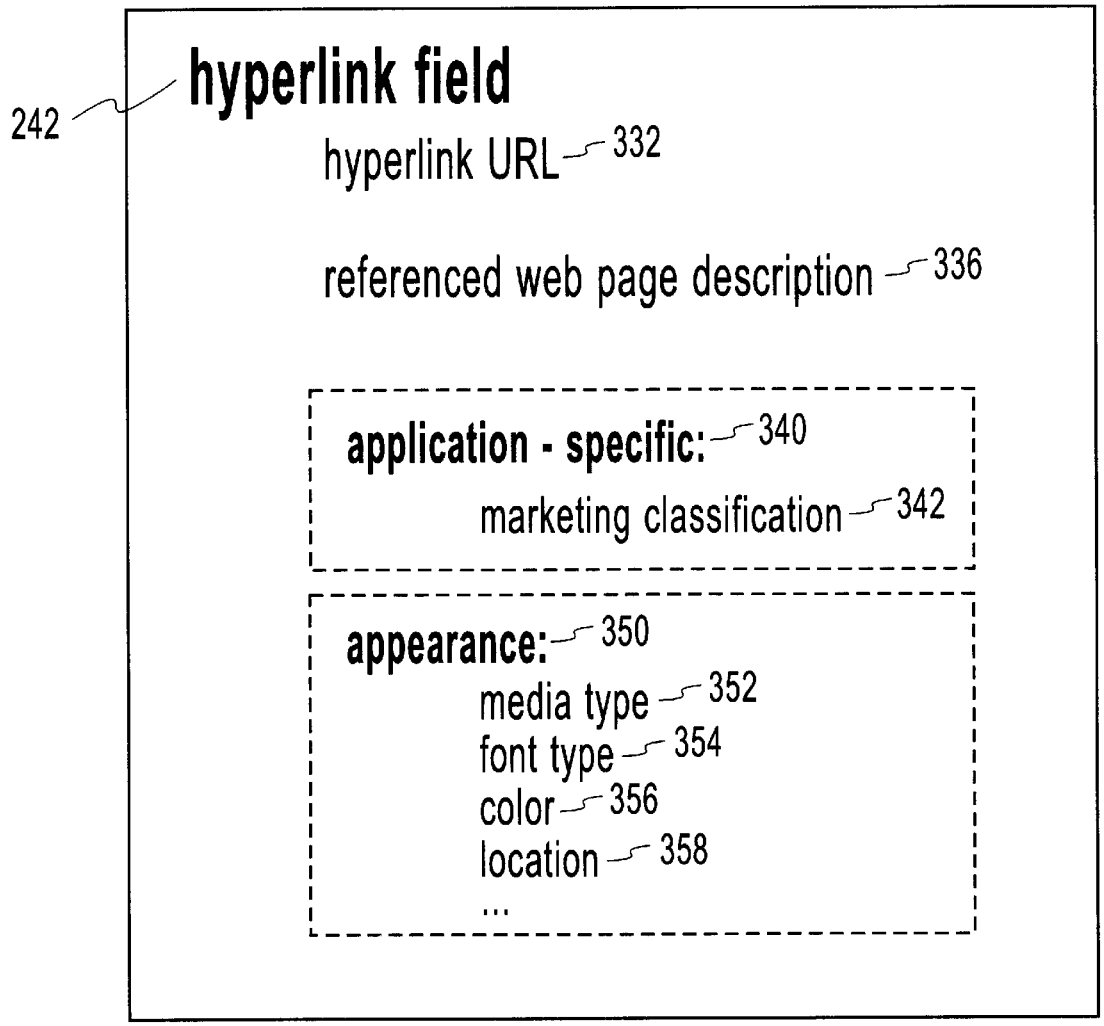
FIG. 3 is a block diagram of a hyperlink field template which contains metadata about a hyperlink on a requested Web page.

FIG. 3 is a block diagram of a hyperlink field template which contains novel metadata about a hyperlink on a requested Web page. The hyperlink field (242) depicted in FIG. 3 is an entry of the hyperlink field list (240) depicted in FIG. 2. A hyperlink is a piece of text, an image, a video clip or any other content element, that when activated takes the requester to another content presentation. The hyperlink field list is used to capture and record information about each hyperlink contained within a content presentation or a Web page. This information enables the invention to assess the efficacy of particular hyperlink features.

The hyperlink field (242) contains application specific information about a hyperlink accessible from the requested Web page (103). The hyperlink field (242) contains an identifier of the accessible Web pages, e.g. the hyperlink URL subfield (332). Typically included with the URL subfield (332), is the information describing the hyperlink, which can include information about the Web page being referenced (336), the appearance or the way the hyperlink was presented (350), and some application-specific information (340).

The referenced Web page description subfield (336) is used to record summary information about the Web page being referenced. Information is recorded at a summary level and at a minimum includes the type of the referenced page, but may include additional information. A classification of electronic catalog pages, such as search page, department page, product page, home page, information page, etc., could be specified in this subfield. Other classification information is envisioned. In the electronic commerce domain, additional information might include product identifier in the case of the product page, or department name in the case of the department page. In a preferred embodiment, this field has the representative format:

referenced Web page description: <category-specific metadata>

The application-specific subfield (340) is used to record information about the hyperlink that is specific to the application. This subfield (340) specifies how this technology is used (applied) in real-world life. The application in this case is the use (application) of Web technology in the e-commerce area. In addition, the subfield (340) may include, but is not limited to, usage and purpose designations for the hyperlink. In the electronic commerce domain, an optional merchandising classification field (342) can be used to identify the primary merchandising cue for which the hyperlink is being used. Examples of merchandising cues include, but are not limited to, direct, up-sell, cross-sell, and promotion. Note that the same hyperlink may be used in multiple merchandising scenarios. For example, the same product link could be used for both a direct product link that might be used for standard catalog browsing, and a cross-sell in which one product is presented along side another. In a preferred embodiment, the representative format for this subfield is as follows:

merchandising classification: <merchandising cue name>

The optional appearance subfield (350) is used to capture specific information about how the hyperlink is visually presented to the user. The media type subfield (352) identifies the type of media that was used to represent the hyperlink. The media type values are text, image, script and form, but may include others. The font type (354) identifies the kind and size of font that was used to represented the hyperlink in the case that the media type value was text. The color of text or image links is specified in the color subfield (356).

This location subfield (358) provides information about where on the page the hyperlink was found. Various methods of location can be specified and might include, position in a list, quadrant of a page, or element of a page (i.e. information bar, site navigator bar, etc). This subfield will be represented in the following format:

location: <locator><locator data>

The <locator> field is used to identify the location method and the <locator data> field is used to hold locator-specific data, for example, list position (n of m), quadrant number (1, 2, 3, etc), or element name (info, nav, etc).

Figure 4:
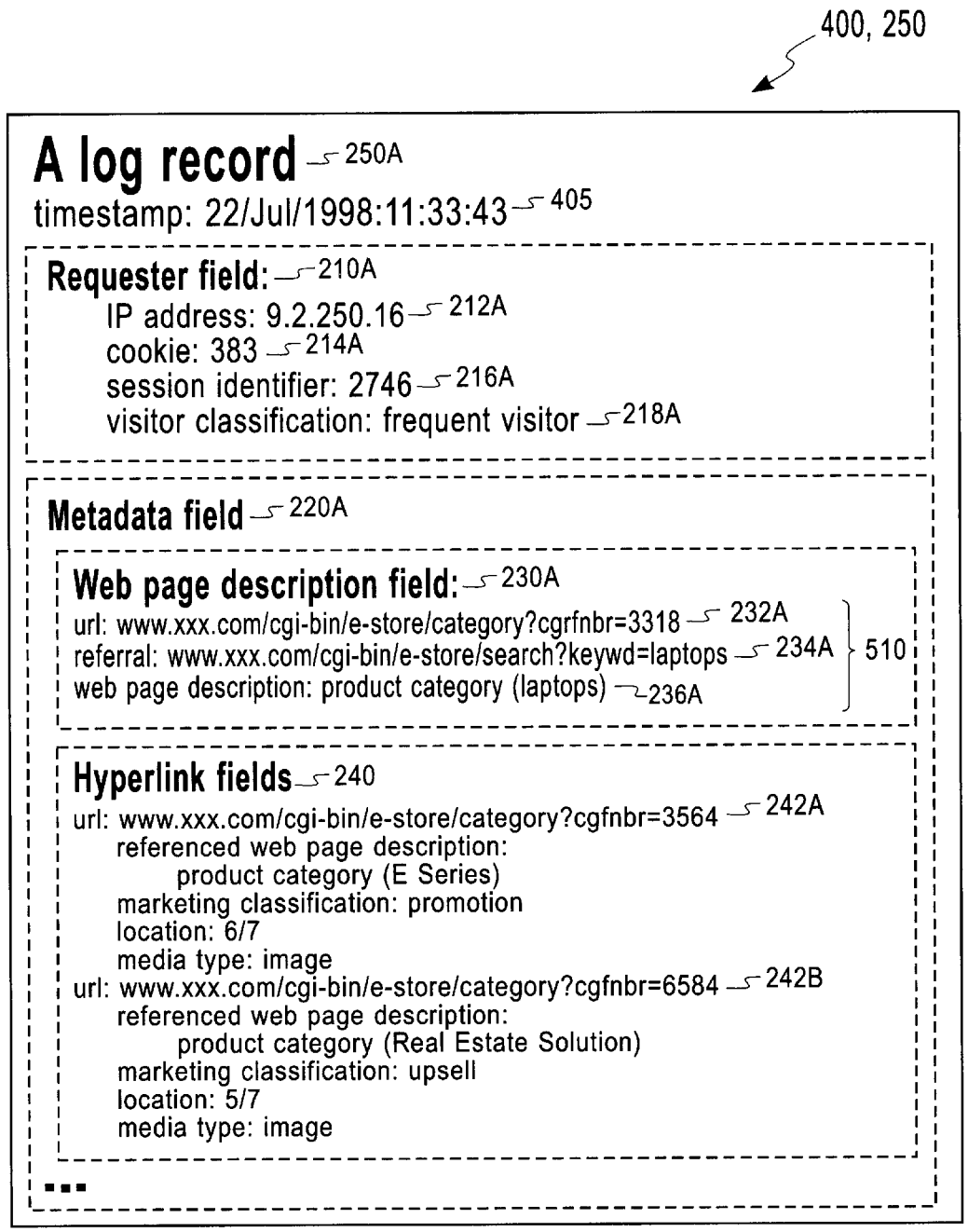
FIG. 4 is an example block diagram of a log record.

FIG. 4 depicts an example of one non-limiting specific instantiation of the log record template (116) used to create the log record (400, 250) shown in FIG. 2. This particular log record (250A) has a specific timestamp (405) stating that the record was written on Jul. 22, 1998 at 11:33, when the Web page (103) was requested.

The requester field of this particular record (210A) has specific values provided. For example, the IP address (212) has the value "9.2.250.16" (212A), the usual sequence of 4 numbers between 1 and 255, separated by dots; the visitor classification (218) is that of "frequent visitor" (218A).

Values are given for the cookie (214A) and the session identifier (216A) as well.

The instantiated metadata field (220A) contains an instantiated Web page description field (230A) and an instantiated hyperlink field (240A). The instantiated Web page description field (230A) gives the URL of the requested Web page (in this case www.xxx.com/cgi-bin/e-store/category?cgrfnbr=3318), the URL from which the request was made (in this case (234A), the user made the request while on a search page by typing in the keyword "laptops"). The Web page description (236A) tells us that the requested Web page is a "product category" page, specifically the category Web page describing "laptop" computers.

The instantiated hyperlink fields section (240A) has two hyperlink fields, describing Web pages which can be accessed from the requested Web page (103). In the first case (242A), the Web page is a "product category" page, describing "E Series" computers; the merchandising classification is "promotion", which means that the product is showcased as part of a special offer, the location is "6/7", meaning that it is sixth in a list of 7 hyperlinks, and the media type is "image", meaning that one click on a picture is required in order to go to the referenced Web page. The second case (242B) provides the same types of information, i.e., the URL, referenced Web page description, merchandising classification, location and media type as the first case. In this case, the merchandising classification is "up-sell", which means that the product is a similar but more upscale item than the items on the current Web page.

Figure 5:
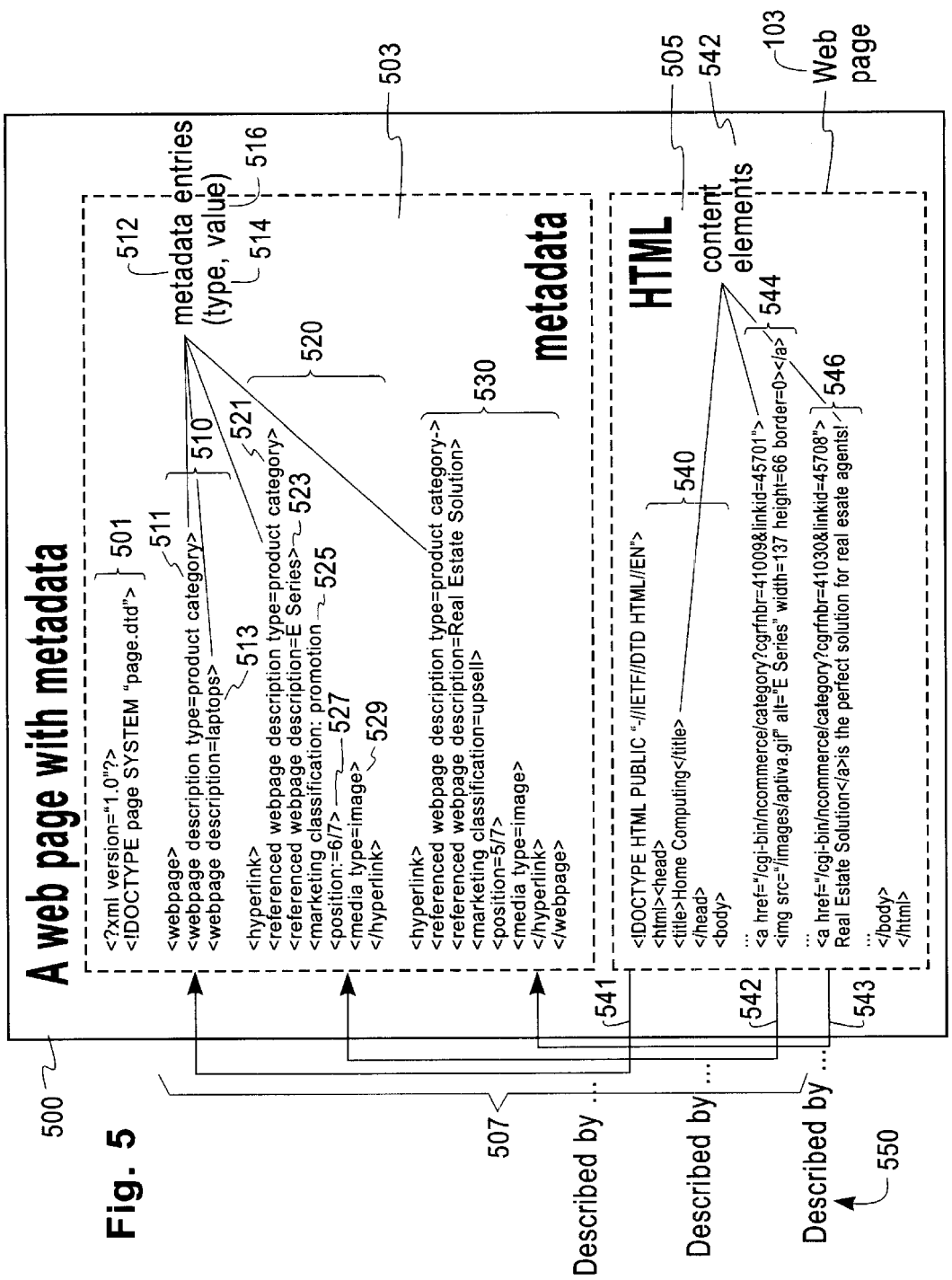
FIG. 5 is an example block diagram depicting source and metadata specification of a Web page where the source determines the presentation of the page and the metadata gives information about the page contents.

FIG. 5 is an example block diagram depicting source and metadata specification of a Web page (500). The diagram comprises the following four parts: the declaration of the particular markup language used (501), possibly including a pointer to the file containing the specification of the particular language fragment of interest, the metadata description of the Web page (503), the formatting language source code for the Web page (505), and a set of links connecting chunks of the metadata description to chunks of the source (507).

In the example, the declaration section (501) comprises a statement specifying that the markup language used is XML (eXtensible Markup Language), and points to a file containing the XML specification, i.e., "page.dtd". Note that, for the metadata description (503), other types of well known markup language can be used, e.g. HTML (HyperText Markup Language) and SGML (Standard Generalized Markup Language). Typically, markup languages are used to insert the sequence of characters or other symbols, often called "tags", at certain places in a document to indicate how the document should look when it is printed or displayed, to describe the logical structure of the document, or to provide information about the document as shown in the metadata description section (503).

The metadata section (503) contains several metadata elements which give meta-level descriptions of the various content elements of the Web page. For example, the top metadata element depicted (510) gives the meta-level description of the Web page which gives information on the type (511) and topic (513) of the Web page; the second metadata element (520) gives a meta-level description of a hyperlink. Each element contains several entities which give the actual meta-level information. For example, the metadata element of the hyperlink (520) contains entries describing the type (521) and topic (523) of the Web page referenced by the hyperlink, the merchandising classification of the hyperlink (525), the position of the hyperlink (527), and the media type of the hyperlink (529). Each entry consists of a (type, value) pair; for example, in entry (527), the type is position and the value is "6/7".

The source section (505) gives the actual source language for the formatting of the Web page. In this example, the familiar HTML is used; however, other languages are possible. The section comprises content elements (542) which correspond to elements of the Web page. Examples of content elements (542) include, but are not limited to, the header part of the HTML source (540) and the HTML tag of a hyperlink (544 and 546).

A set of links (507) is shown, relating metadata elements and the content elements they represent. For example, a link (592) connects a metadata element (520) (the description of a hyperlink) with a content element (544) (the HTML source of the hyperlink).

The "described by" connections (550) indicate that metadata entries (512) in the metadata section (503) have information about content elements (542) in the source section (505). In the example in FIG. 5, each content element (542) has a corresponding metadata entry (512). Further some of the content elements are hyperlinks and there is novel metadata containing information about those hyperlinks (503).

Figure 6:
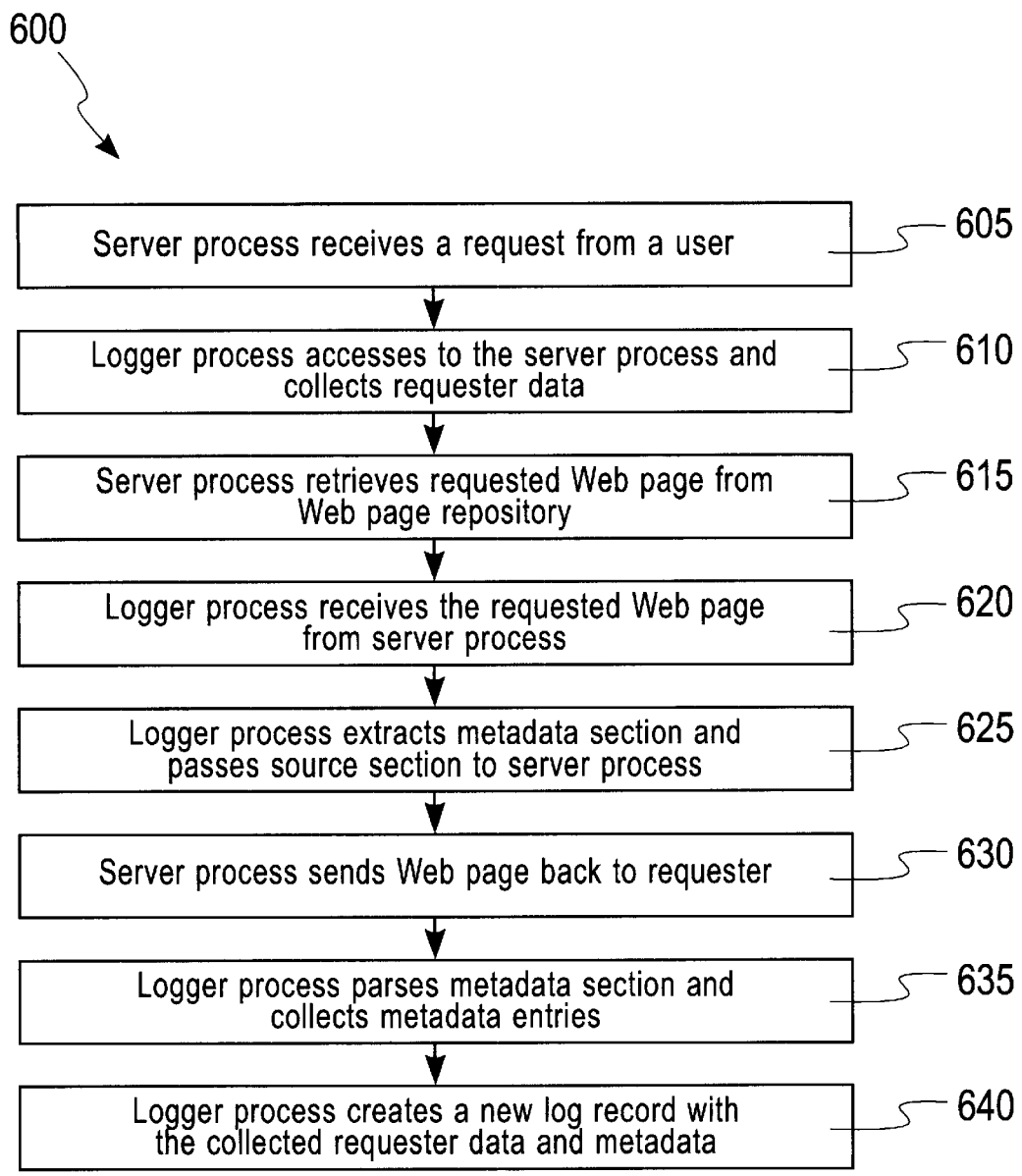
FIG. 6 is a flow chart of a preferred logger process.

FIG. 6 is a flow chart of a preferred logger process (600) which is used to extract and log the metadata (503) associated with each Web page (103) as it is served to the requester (101). When the server process (110) receives a request from a user (605), the logger process (600) accesses to the server process (110) and collects requester data (210A) that will be used to populate the requester field (210) of the log record (250) for this request (610). In the meantime, the server process (110) processes the request (102), and retrieves the requested Web page (103) from the Web page repository (615, 140). Then the server process forwards the requested Web page to the logger process (620). The Web page (500) is one as depicted in FIG. 5 and as such includes both HTML source section (505) and the metadata section (503) that describes the HTML source.

The logger process (600) extracts the metadata section (503) from the Web page, and forwards the remaining HTML source section of the page (505) back to the server process (625). Then the server process (110) sends the Web page (103) back to the requester (101) through the network connection (630).

The logger process (600) parses the metadata section (503) and collects metadata entries (512) about the page that will be used to populate the metadata field (220) of the log record for this request (635). All or part of the metadata section (503) may be selected to populate the metadata field (220) in the log record (250) of this request. The logger process (600) extracts metadata value (503) in a Web page (500) and fills in the subfields of the metadata field (220) of the log record template (250) with the extracted metadata. Note the difference between the metadata value (503) in a Web page and the metadata field (220) in a log record template. An example of the result of this process is shown in a log record (250A) in FIG. 4 whose metadata field (220A) is filled with metadata values extracted from the metadata section (503) of a Web page (500). The logger process creates a new log record (e.g. 250A) for this request (102) and populates the requester (e.g. 210A) and metadata field (220) of the record (250) with the data it collected above (640).

Given the detailed description of the system and method for collecting and analyzing information above, a more detailed description of a preferred embodiment for aggregating and further analyzing this information is now given as a preferred embodiment of the invention in the description of FIGS. 7–11 below. Note that this aggregation system and method has general applications in the analysis of Web site performance and is further described and claimed in U.S. patent application Ser. No. 09/238,238, entitled AGGREGATING AND ANALYZING INFORMATION ABOUT CONTENT REQUESTED IN A NETWORK (WORLD WIDE WEB) ENVIRONMENT TO DETERMINE CONVERSION RATES, filed on the same day as this invention with the same inventorship, which is herein incorporated by reference in its entirety.

Figure 7:
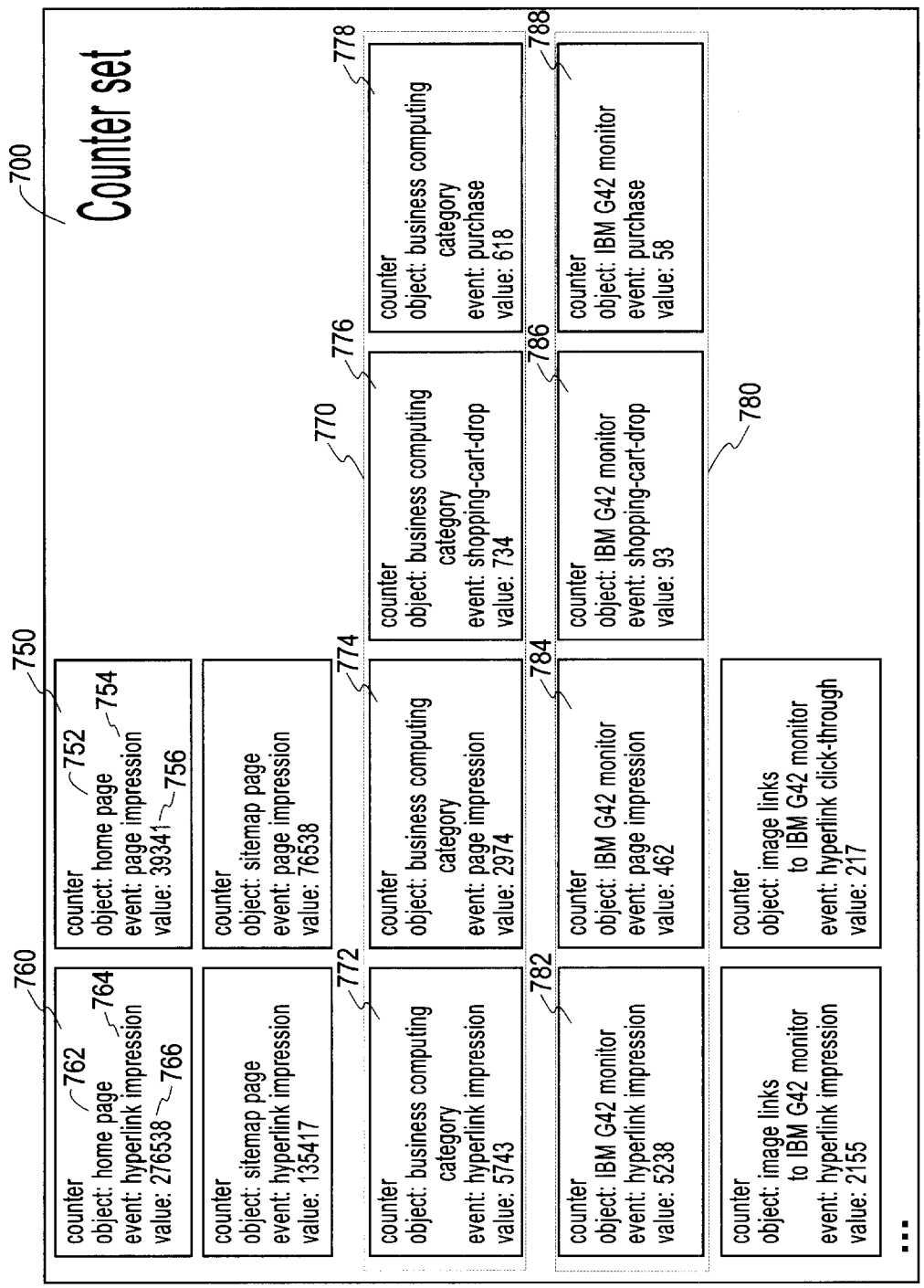
FIG. 7 is a block diagram of a counter set of one or more counter records.

FIG. 7 shows a counter set (700) of records generated by the aggregation process (900). The purpose of these counter records (750) is to count the number of occurrences of certain events as they relate to certain objects (752) in other counter records (750).

Generally, an object is the entity, or type of information, used for computing conversion rates. An object can be either a Web page or a hyperlink in a Web site. By using the metadata of the Web page and/or hyperlink (particularly, the Web page description field (236) for the Web page and referenced Web page description field (336) for the hyperlink), the Web page and the hyperlink can be given a name meaningful to Web site owners, merchandisers and designers. These names can include: a product name, a product category name, a shopping-cart page, a product-purchase page, a home page, a search request page, a search result page, an index page, etc. In an e-commerce Web site, these information types are of particular interest when computing the conversion rates for products and/or product categories. To continue the explanation by example, an object can be page-related and/or hyperlink-related. Some examples of objects are the information in FIG. 5, e.g. items 511 and 521. For instance, object values can be the values (e.g., laptops, E series) of a Web page description and a referenced Web page description of metadata entries (513, 523) in FIG. 5.

Later, conversion rates for one or more of these objects are determined. Typically, objects are selected because they are related to revenue of the Web site. They are defined at a page-level and/or a hyperlink-level, as well as at the level of the entire Web site as a whole. Also objects can be sub-classified, e.g., in a product taxonomy like vendor, price, color, product type. Typically, a taxonomy is a hierarchical structure of products by criteria such as department, category, vendor, and color. Thus by using the invention, merchandisers can determined how effective the Web site is at the fine granularity of the object level and determine conversion rates at these granularities or sub-categories. The invention enables relating product taxonomy to their Web page presentation and tracking how each product (object) at each taxonomy level is used on a Web site.

Generally, the conversion rates measure the effectiveness of marketing of a product in an e-commerce Web site, representing what percentage of requesters a hyperlink retained and carried over to the next step in the shopping process. Steps in the shopping process include: being introduced to the product, browsing the information of the product, inserting the product into the shopping cart, and/or placing an order for the product, as they click on hyperlinks of the product associated with each step.

A counter record (750) in the figure, for example, stores the number of page impression events (754) for the home page (752) and has 39,341 as its value (756). With this invention, it is possible to count the number of occurrences of certain events for any object, i.e., Web page, product, category, or hyperlink shown on the page, when the Web pages are served. In contrast to the prior art, there is no need to attach a small counting program to an object of interest and invoke the program each time the object is seen or clicked. Therefore, the cost for event counting process is kept to a minimum. This fact can be used on a large scale to count multiple events for multiple objects at the Web page/Web site. Using this invention, a huge variety of events (754) can be counted/tracked and eventually used and evaluated in the aggregation process (900). This invention permits the monitoring and tracking of these events, especially the events in shopping flow in an e-commerce Web site, and helps determine the effectiveness of the Web site, Web pages on the site, and/or parts of the Web pages.

Example types of counter events (754) allowed in a counter record (750) include hyperlink impressions, Web page impressions, shopping cart impressions, hyperlink click-throughs, shopping cart drops, and purchases. These are basic activities of shoppers in electronic commerce Web sites, and the ability to analyze the patterns of these activities is critical for successful product marketing and sales.

An event (754) can be related to a number of various counter objects (752). As a non-limiting example, in the table below, an "x" indicates a valid relationship between an event (754) and an object (752); and that a counter (750) could exist for this relationship.

| | Event> | | | | |
|---|---|---|---|---|---|
| Object Type | Hyperlink Impression | Hyperlink Click-through | Web page Impression | Shopping Cart Placement | Purchase |
| product category | x | | x | x | x |
| product | x | | x | x | x |
| Web page type such as | x | | x | | |
| home page | x | | x | | |
| search results page | x | | x | | |
| index page | x | | x | | |
| shopping cart page | x | | x | | |
| product category page | x | | x | | |
| product page | x | | x | | |
| error page | x | | x | | |
| site map page | x | | x | | |
| hyperlink | x | x | | | |

Figure 8:
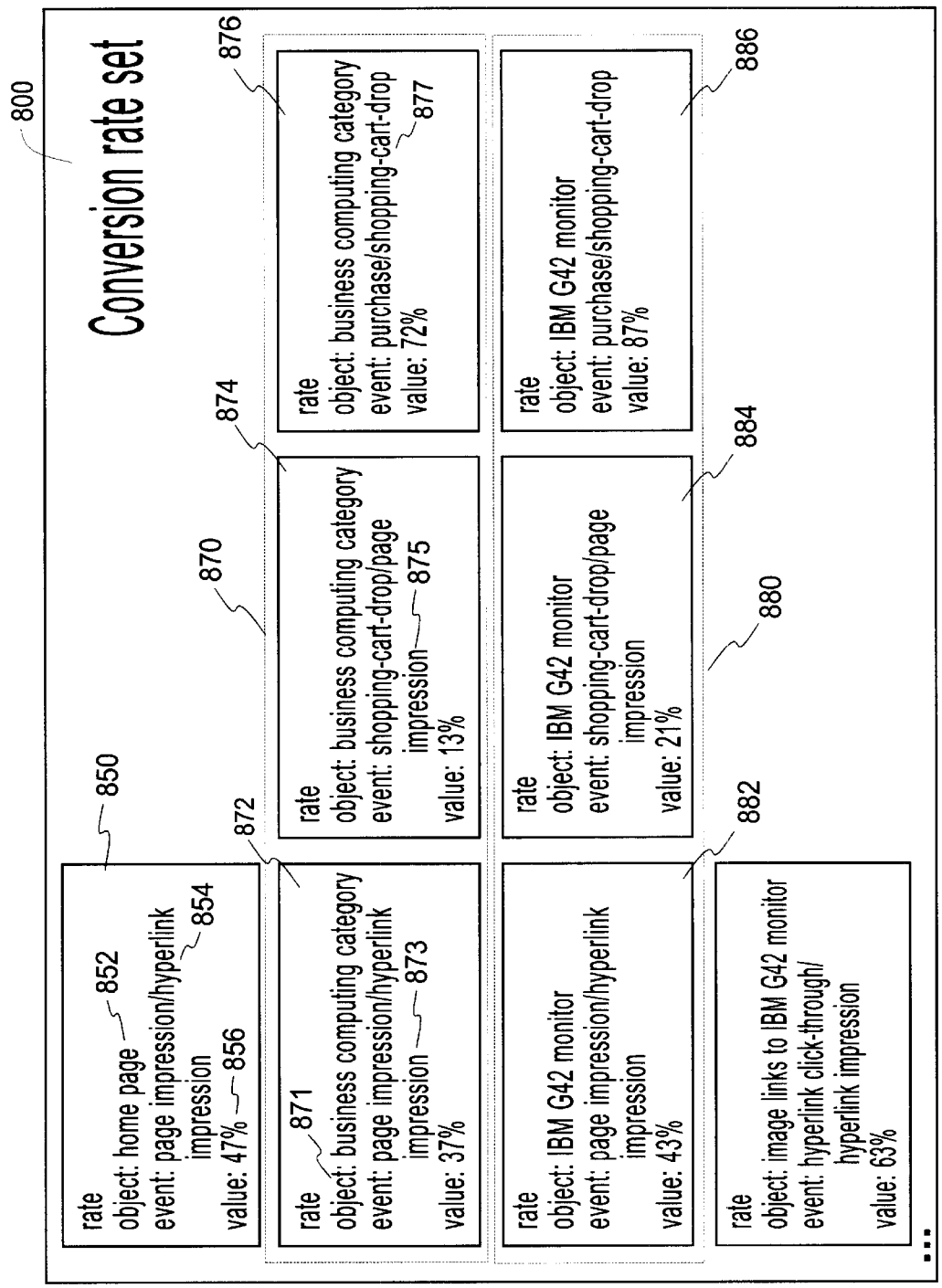
FIG. 8 is a block diagram of a conversion rate set of one or more rate records.

Conversion rates (850) describe the likelihood of one event translating into a second event. FIG. 8 shows a conversion rate set (800) of various example conversion rates (850) and shows how the rates (850) are determined using the counter records (750) shown in FIG. 7. A rate value in a rate record (850) is calculated by dividing the values of two counters that share a common object (852). In a typical example case (850), the counter value (756) for page impression events of the home page is divided by the counter value (766) for hyperlink impression events of links pointing to the home page object (854). The resulting value (856) is the percentage of home page hyperlink impressions that led to impressions of the home page. In other words, the percentage of those users who saw the home page out of all those who saw links to the home page. A higher conversion rate in this context means that the links are more effective in getting users to click on them.

Because the aggregation process can efficiently create counter sets for any given event and any given object on a Web page and/or Web site, this invention can determine the conversion rates of almost any general type and number of objects in a Web site for almost any general type and numbers of event. This is done with only limited amount of performance cost. The result is extending the meaning and use of conversion rates in measuring Web site performance and Web site design.

As an illustration, a non-limiting example of valid conversion rates (850) are described in the table below. An "x" indicates that the event counter A can be divided by, or otherwise related to, event counter B.

| EVENT B | EVENT A> | | | | |
|---|---|---|---|---|---|
| | Hyperlink Impression | Hyperlink Click-through | Web page Impression | Shopping Cart Placement | Purchase |
| Hyperlink Impression | | x | x | x | x |
| Hyperlink Click-through | | | | x | x |
| Web page Impression | | | | x | x |
| Shopping Cart Placement | | | | | x |
| Purchase | | | | | |

Figure 9:
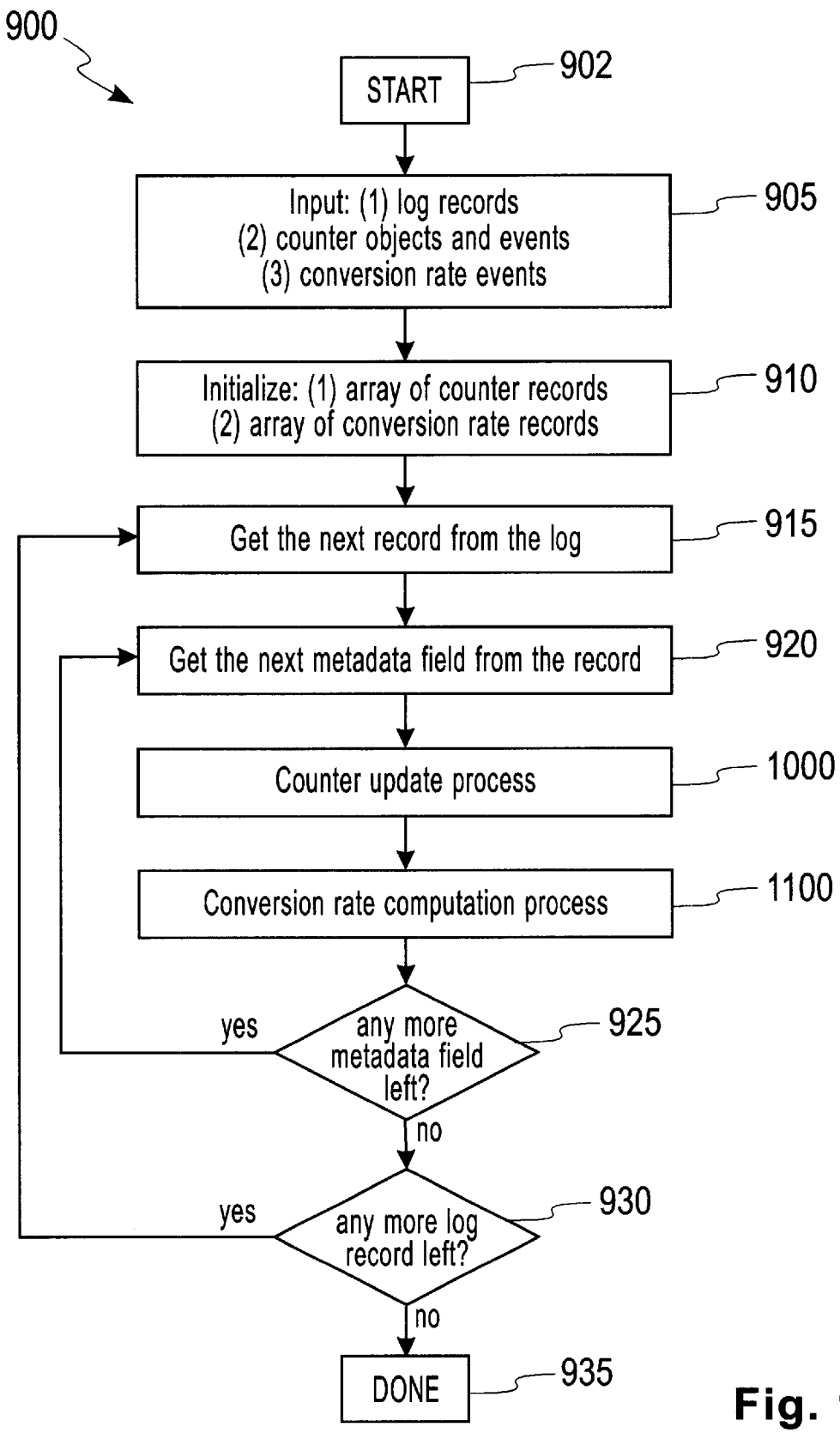
FIG. 9 is a flow chart of a preferred aggregation process.

FIG. 9 is a flow chart of a preferred aggregation process (900). Initially, the process is given the log (200) as input (905). In addition, the aggregation process (900) is given the counter objects (852) and events (854) of interest as input (905). For example, suppose that the user of the aggregation process (900) is an owner of an e-commerce Web site which sells computer equipment. If the person is interested in tracking how the various products in the business computing category on this site are navigated and pursued by the visitors, she/he will provide the aggregation process (900) with the counter records (750) for the products in the category and for the category as input. Further, for the sake of simplicity, suppose that there is only one product in the category, IBM G42 monitor. Then there can be several counter records (750) for the IBM G42 monitor, and the same number of counter records for the business computing category. The object (752) of the first counter record set is the IBM G42 monitor, and this counter record set (780) contains one record (782, 784, 786, and 788) for each possible event for products—hyperlink impression, Web page impression, shopping cart placement, purchase, etc. The object of the second set (770) is the business computing category, and the set also contains one record (772, 774, 776, and 778) for each possible event for product categories. These counter records (750) can be implemented by using a two-dimensional array with the first dimension representing the selected counter objects and the second being the selected counter events. Each cell in the array represents the value of a counter record. The aggregation process (900) creates this array of counter records by using the counter objects and events of interest given as input (910).

The aggregation process (900) requires another type of input, i.e., the conversion rate records (905). There is one set of conversion rate records (880) for each counter record object (881). In the above example, there will be a set of rate records for the IBM G42 monitor and another set for the business computing category. In each set, each member record has a different event, i.e., conversion rate computation method, for the given object. That is, in the rate set of the IBM G42 monitor, there is a record (882) for the number of page impression divided by the number of hyperlink impression, and another (884) for the number of shopping cart placement divided by the number of page impression. The event (873, 875, and 877) of each record (872, 874, and 876)) in the business computing category set is similarly determined. The conversion rate records (800) again can be implemented by using a two-dimensional array with the first dimension representing the rate objects and the second being the rate computation methods. Each cell in the array represents the conversion rate of interest. The aggregation process (900) creates this array of conversion rate records (910).

The aggregation process (900) retrieves a record from the log (915). The process then retrieves metadata fields (220) in the log record, i.e., Web page description field (230) or hyperlink field (242), one at a time (920). The process checks if the field (220) requires any change to any counter record value (756), and, if it does, updates one or more counter values selected (1000). The details of this step will be described below in FIG. 10.

Whenever there is a change in one or more counter values, the aggregation process (900) identifies all the conversion rate records (850) whose values are computed by using the updated counter value (756), and computes those rate values accordingly (1100). The details of this will be described below in FIG. 11.

The aggregation process (900) continues to parse metadata fields (220) in a log record (400, 250) until there is no metadata field left in the record (925). Once the aggregation process (900) finishes a log record (400, 250), then it processes the next record (400,250) from the log (200). This process normally continues until (935) there is no record (400,250) left in the log (930). Also, sometimes a user may request the process to stop (935) even when there are unprocessed records (400, 250) left in the log (200).

Figure 10A:
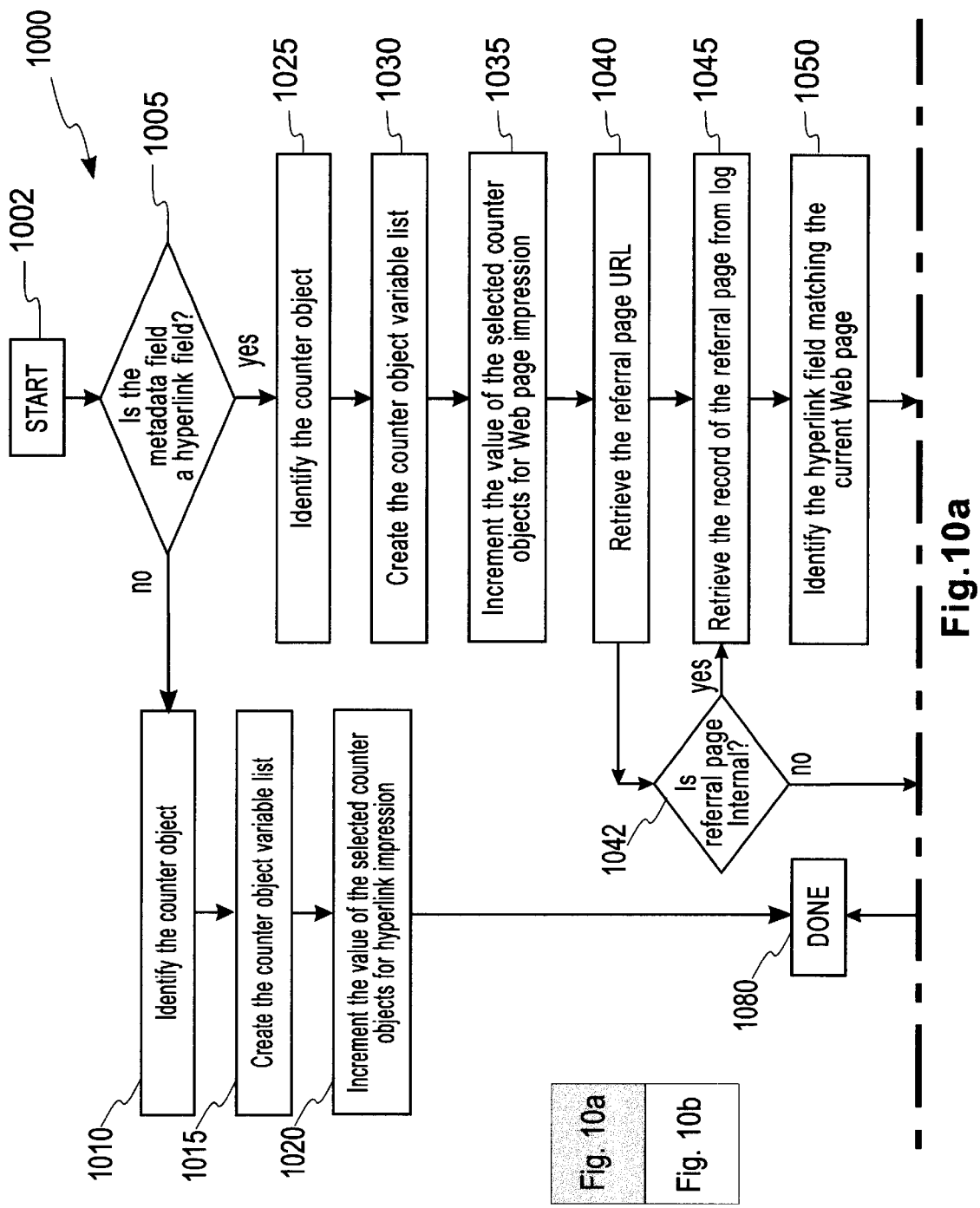
FIG. 10 is a flow chart of a preferred counter update process.
Figure 10B:
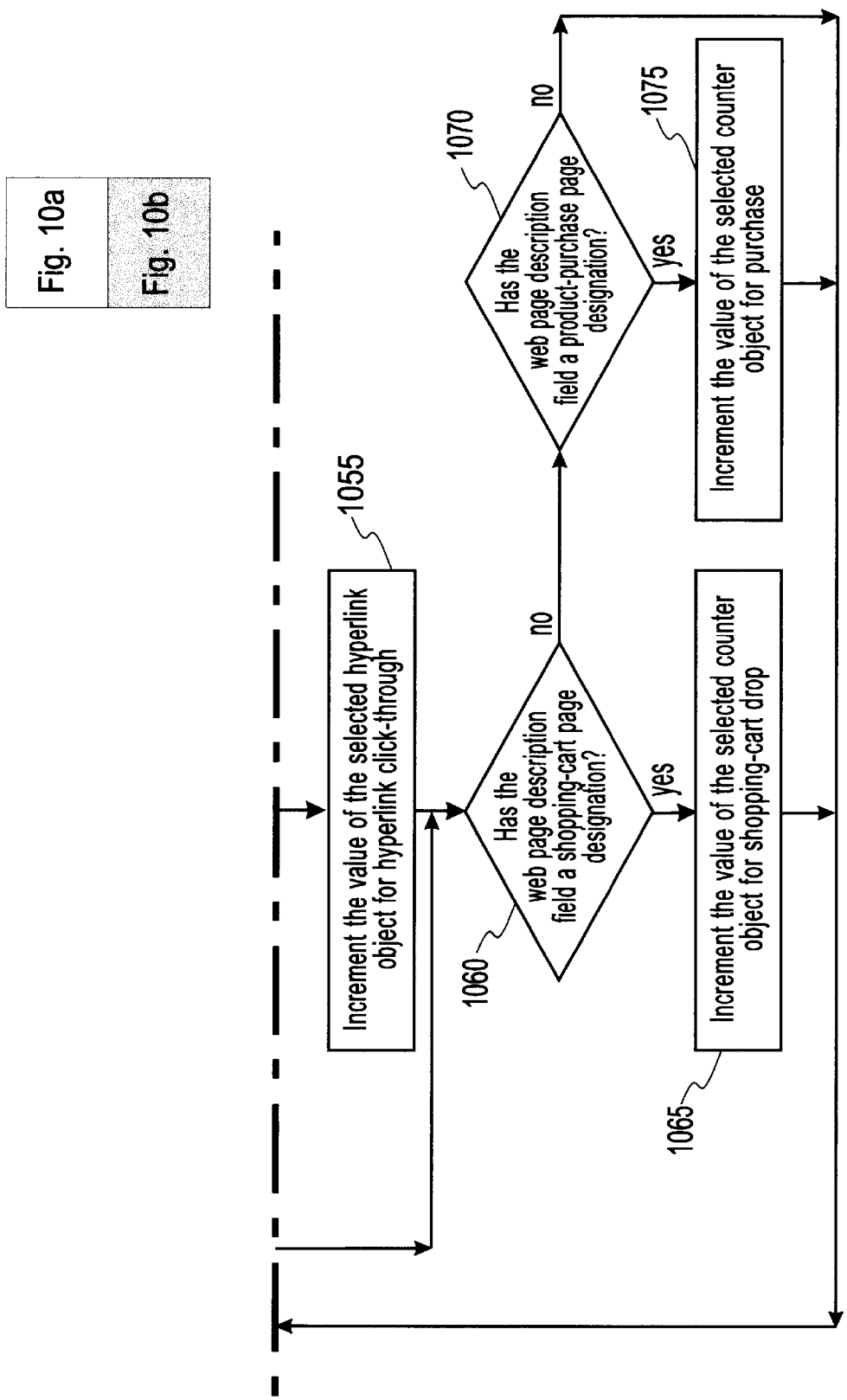

FIG. 10 is a flow chart of a preferred counter update process (1000) showing the details of step 1000 in FIG. 9. Note that this process is performed against a metadata field (220) retrieved from a log record (400, 250). Initially, the process (1000) checks if the metadata field (220) is a hyperlink field (1005). If so, the process identifies the matching counter object by scanning the referenced Web page description subfield (1010), and assigns the object in an object variable list (1015). If the object is a product, e.g., a product item on sale on the e-commerce Web site, then the process (1000) stores the category of the product in the object variable list. The process (1000) increments the value of the counter records whose objects are ones stored in the object variable list and whose event is the hyperlink impression (1020). In this case, the process finishes (1080) at this point.

If the current metadata field (220) is not a hyperlink field, then the field is a Web page description field (230). In this case, the process identifies the matching counter object by parsing the Web page description subfield (1025), and assigns the object in an object variable list (1030). If the object is a product, then the process stores the category of the product in the object variable list. The process increments the value of the counter records whose objects are ones stored in the object variable list and whose event is the Web page impression (1035).

Then the process retrieves the referral page URL from the referral URL subfield (1040). If the URL is internal to the site, the process retrieves the log record (400, 250) whose Web page URL subfield value matches with this referral page URL (1045). Otherwise, the process skips to step 1060 (1042). From the log record (400, 250), the process identifies the hyperlink field whose hyperlink URL matches with the Web page URL in the current log record (1050). The process increments the value of the counter record (750) whose object is the identified hyperlink and whose event (754) is the hyperlink click-through (1055).

Now the process checks if the Web page description field has a shopping cart designation (1060). If so, the process increments the value of the counter records (750) whose objects are ones in the object variable list, i.e., product and category objects, and whose event (754) is the shopping cart placement (1065). In this case, the process stops at this point (1080).

In case the Web page description field (230) does not have a shopping cart designation, the process continues to check if the field has a product purchase designation (1070). If so, the process increments the value of the counter records (750) whose objects (752) are ones in the object variable list, i.e., product and category objects, and whose event is the purchase (1075). The process stops at this point (1080).

Figure 11:
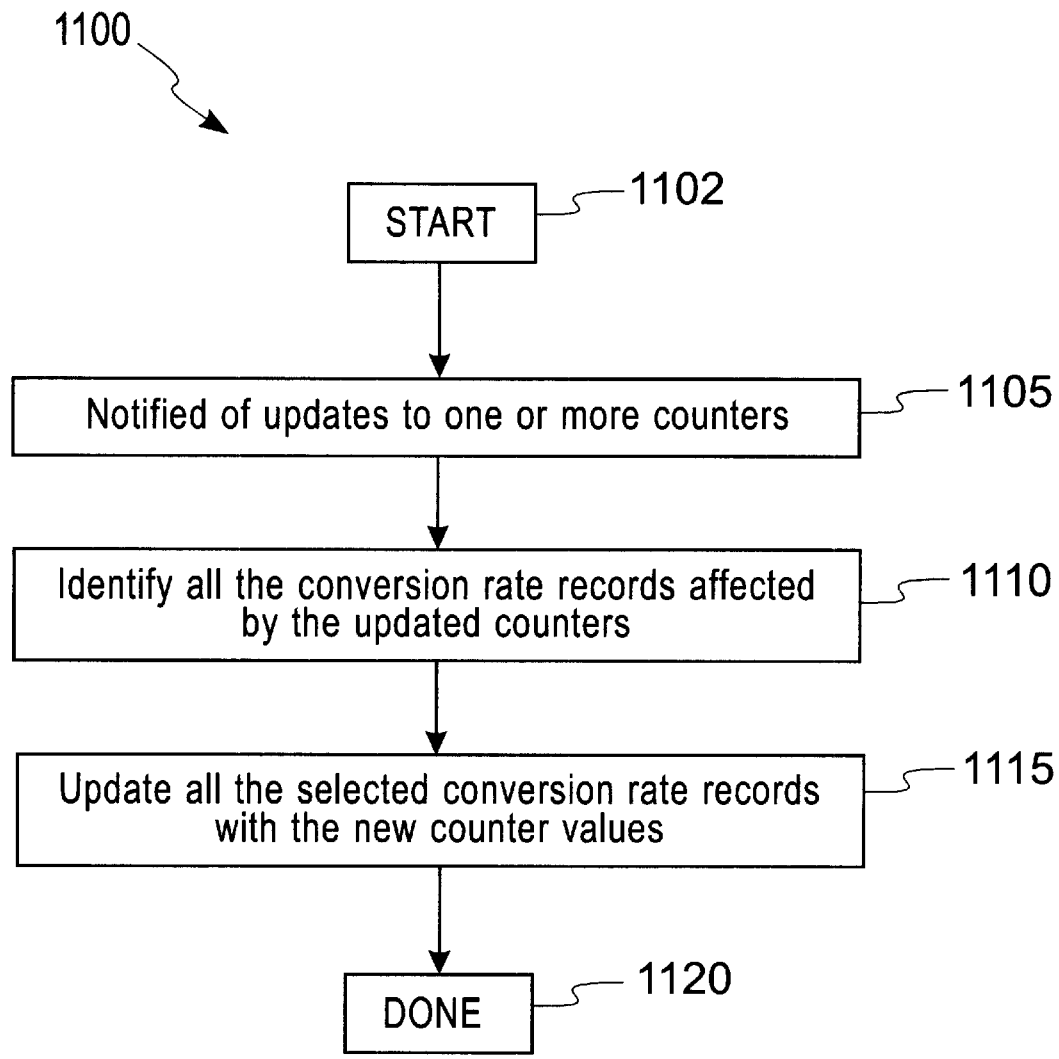
FIG. 11 is a flow chart of a preferred conversion rate computation process.

FIG. 11 is a flow chart of a preferred conversion rate determination process (1100). This process starts when it is notified of any update in one or more counter records (1105). This process identifies all the conversion rate records (850) whose object is the same as that of the counter records (750) and whose event (854), i.e., conversion rate determination method, uses the event of the counter record (1110). The process then goes over each of the conversion rate record (850) and updates its value (856) by applying its rate determination method to the new counter values (1115).

The following are definitions used in the present invention: a cross-sell link is a link to a Web page marketing an item complementary in function to the item marketed on the current Web page; an up-sell link is a link to a Web page marketing a similar but more upscale item than the item marketed on the current Web page; a personalization link is a link to a Web page which offers personalized service, such as the display of a selected subset of products, based on knowledge of a user; a recommender link is a link to a Web page which suggests Web pages that are likely to be of interest to the user based on knowledge of the user and the behavior of a larger population; and a requester classification is a method of categorizing requesters according to some predetermined classification. Additionally, a string that uniquely identifies the particular session between a client and server is usually alphanumeric.

We claim:

1. A computer system having one or more central processing units, one or more memories, and one or more network interfaces connected to one or more networks, the system further comprising:

a server process, executed by one or more of the central processing units, the server process receiving one or more requests for one or more Web pages from one or more requesters through the one or more network interfaces, producing the requested Web pages from the one or more memories, and further serving each of the Web pages with one or more content elements to the requester, wherein one or more of the served Web pages comprise one or more metadata entries, each metadata entry associated with one or more hyperlinks on a served Web page, each metadata entry containing information about one or more of the content elements; and a logger process, executed by the server process, that removes metadata entries from Web pages prior to the server process serving the Web pages, wherein the Web pages with metadata entries are served to requesters without the metadata entries, the logger process storing the metadata entries in one or more of the fields of a log having a plurality of records.

2. A system, as in claim 1, wherein each record has one or more requester fields and one or more metadata fields, and wherein the logger process stores a requester identification, associated with the requester, in the requester field of the record associated with a respective Web page.

3. A system, as in claim 2, where the requester identification is any one or more of the following: a cookie, an IP address, a session identifier, a string, and a requester classification.

4. A system, as in claim 2, where the metadata field contains one or more hyperlink fields, where each of the hyperlink fields comprise any one or more of the following: a Universal Resource Locator (URL) referenced by a hyperlink on the respective Web page being served, a description of the respective Web page referenced by the hyperlink, an application-specific description, and a description of a hyperlink appearance when it is rendered by a browser.

5. A system, as in claim 4, where the description of the Web page referenced by the hyperlink includes one or more the following: a product category name, and a product name.

6. A system, as in claim 4, where the description of the hyperlink appearance includes one or more of the following: a media type, a font type, a location on the rendered Web page, and a color.

7. A system, as in claim 4, where the application-specific description includes one or more of the following merchandising classification links: a cross-sell link, an up-sell link, a promotion, an advertisement, a search, a direct-link, a personalization link, and a recommender link.

8. A system, as in claim 2, where the metadata field further contains a Web page description field, where the Web page description field is any one or more of the following: a Universal Resource Locator (URL), an URL of a referral Web page, and a description of the respective Web page.

9. A system, as in claim 8, where the description of the respective Web page includes any one or more of the following: a home page designation, a product name, a product category name, a search page designation, an index page designation, a shopping-cart page designation, a product-purchase page designation, a sitemap page designation, and an error page designation.

10. A method for collecting data about Web pages, comprising:

producing requested Web pages from one or more memories, each of the requested Web pages comprising one or more content elements, wherein one or more of the requested Web pages comprise one or more metadata entries, each metadata entry associated with one or more hyperlinks on a requested Web page, each metadata entry containing information about one or more of the content elements;

removing metadata entries from Web pages having the metadata entries;

storing the removed metadata entries in one or more of the fields of a log having a plurality of records; and serving the Web pages, with metadata entries removed, to one or more requesters.

11. A computer program product for collecting data about Web pages, the computer program product performing the steps of:

producing requested Web pages from one or more memories, each of the requested Web pages comprising one or more content elements, wherein one or more of the requested Web pages comprise one or more metadata entries, each metadata entry associated with one or more hyperlinks on a requested Web page, each metadata entry containing information about one or more of the content elements;

removing metadata entries from Web pages having the metadata entries;

storing the removed metadata entries in one or more of the fields of a log having a plurality of records; and serving the Web pages, with metadata entries removed, to one or more requesters.

* * * * *